Figure 1:
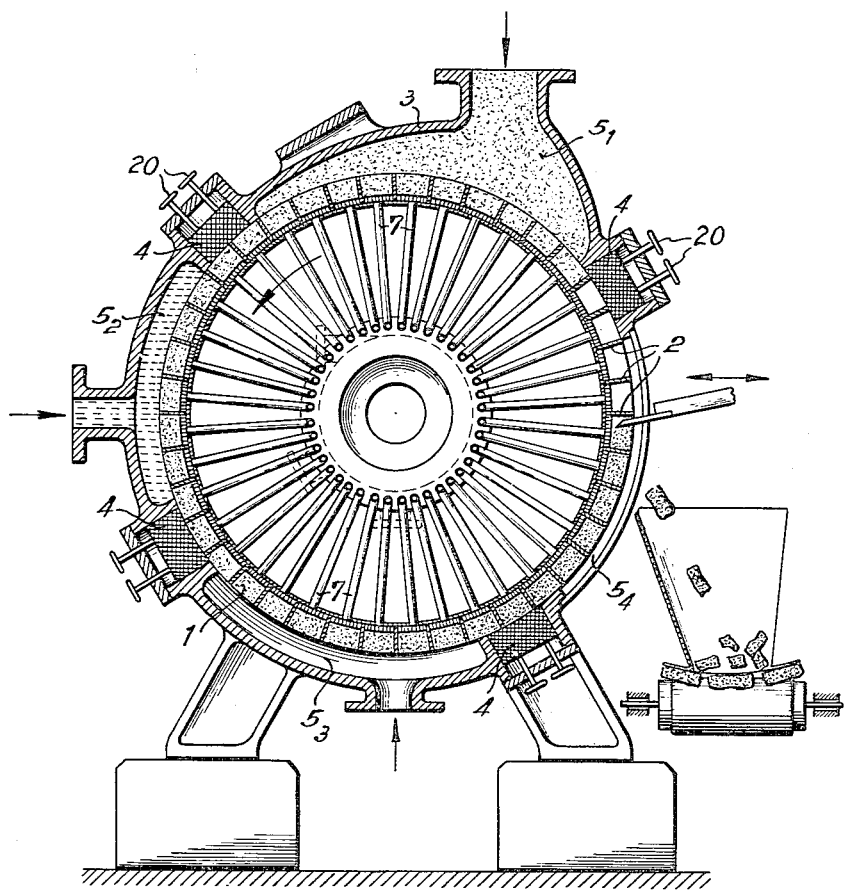

April 10, 1956     E. FEST     2,741,369
ROTARY FILTERS

Filed May 22, 1953     2 Sheets-Sheet 1

INVENTOR
ERICH FEST
By: Young, Emery & Thompson
Attys.

April 10, 1956 E. FEST 2,741,369
ROTARY FILTERS
Filed May 22, 1953 2 Sheets-Sheet 2

INVENTOR
ERICH FEST
By: Young, Emery & Thompson
Attys.

2,741,369
ROTARY FILTERS

Erich Fest, Munich, Germany, assignor to Firma Apparatebau G. m. b. H., Munich, Germany Application May 22, 1953, Serial No. 356,699

1 Claim. (Cl. 210—201)

Rotary filters are known for the separation of a suspension into liquid and solid phases. The force effecting the filtration in them is the pressure difference, which prevails between the two sides of the filter medium. Partially for natural and partially for economic reasons relatively narrow limits are set to the usable pressure difference. If the filter acts as vacuum filter the pressure difference can amount to one atmosphere at the most in the theoretically most favorably case. If the apparatus is operated as rotary filter, a limit is set for the usable pressure difference by increased cost of production, which one can expend for the pressure-proof housing. The height of the pressure difference in the case of the hitherto known pressure filter constructions is especially restricted in cases, in which on the one hand it would not be desirable to filter against the action of the force of gravity having regard to the heterogeneous volume size of the particles of solid substances and on the other hand has to carry out a good washing out of the cake. In these cases inner filters, which can be constructed as pressure filters, cannot be used, whereas rotary filters with the above duty could up to now only be constructed as suction filters.

A further disadvantage of the previously known rotary filters is that the filter trough could never be filtered completely empty, so that a certain residual amount of sludge remained in it. This has an especially unpleasant effect in cases where the solid substances altered to their disadvantage due to longer stay in the suspension or undesirable concentrations occur in the liquid phase of the suspension, as is the case, for example, in the production of metal oxide and hydroxide contacts, etc.

In the washing out of the filter cake it has always proved to be disadvantageous, if cracks develop in the cake during the washing, through which the washing medium preferably passed but badly utilized. Various proposals have been made to avoid this disadvantage. Up to the present it has always proved best to place so much washing medium at the disposal of the filter cake during the washing that a shrinkage of the volume of the filter cake cannot occur and consequently no cracks are produced. This advantage, which the below described new filter possesses, affords the possibility to this filter, to use it in addition to the filtration and washing out of the residue of a suspension, preferably for the special leaching out, that is extracting of a substance. The closed chambers, separated from each other, for the carrying out of this process make this possible.

The present invention consists of the fact that the operations carried out on the circumference of the filter drum in various sections, such as separation, washing, drying and discharge of the filtrate are carried out optionally by means of subatmospheric pressure or by means of pressure above atmospheric pressure or by means of pressure above or below atmospheric pressure. For the application of this method the arrangement is so made that the drum casing of the filter drum has axially parallel ribs, which protrude beyond the surface of the filter drum by the desired thickness of the filter cake, so that the filter drum is arranged in a pressure and vacuum proof housing, which is subdivided into a plurality of chambers by separating stoppers sliding on the separating ribs and that these chambers can be connected optionally to pressure, which is above, below or above and below atmospheric pressure.

The figures show one example of construction, namely

Figure 2:
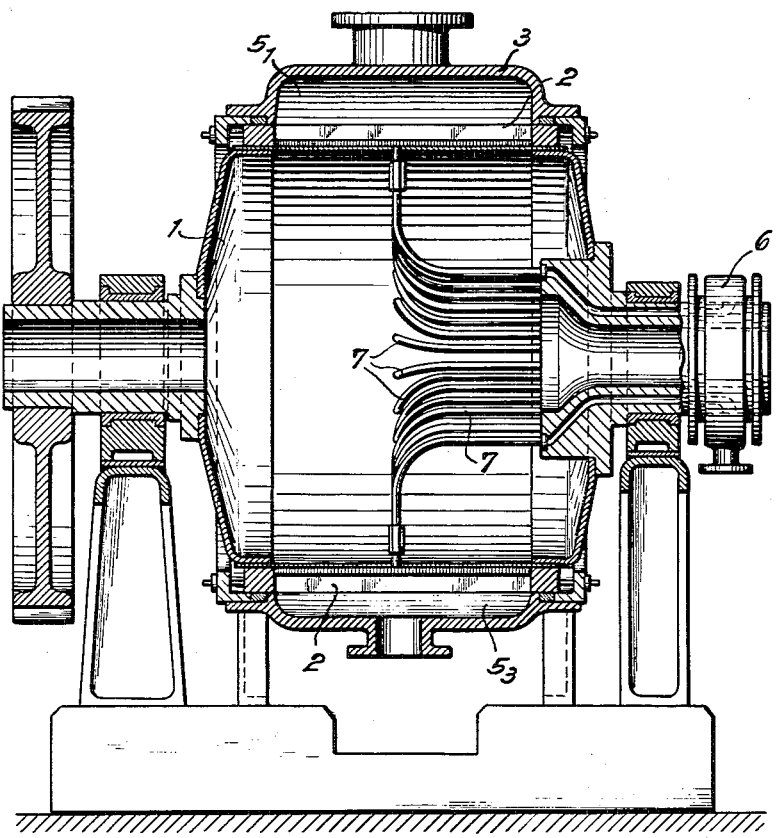

Figure 1 shows a rotary filter in accordance with the invention in cross-section; and Figure 2 is an axial section thereof.

Referring now to the drawings in detail:

The filter drum 1 is produced in known manner with or without filter cells. It carries, however, on the outer circumference separating bars or ribs 2 parallel to the axis, which, for example can be welded on, screwed on or inserted and the height of which can be adapted as much as possible to the desired thickness of the cake. The filter drum is inserted in a housing 3, which is preferably constructed cylindrical and is fitted concentrically to the drum. On the circumference of this housing axially parallel separating members 4 are incorporated in the housing wall and by this subdivide the annual space between the housing wall and the filter drum into chambers ($5_1$–$5_4$). The separating members have a width, which preferably corresponds fully to the separation of two separating ribs 2 on the drum and a length which corresponds with the filter drum. The separating members can consist of metal, rubber, wood or plastic. Due to a plurality of apertures in the housing wall, situated next to each other, for the reception of such stoppers an alteration of the size of the chambers can be achieved. The separating members are adjustable from the outside during the operation of the filter by screws 20. By means of these members 4 on the one hand and the separating ribs 2 on the other hand the space between the drum and the housing 3 is divided into the chambers $5_1$, $5_2$, $5_3$ and $5_4$, for example according to the drawing. Each drum section limited by two separating ribs 2 can be connected in known manner by a pipe 7 with a control device 6, known per se, for the separate discharge of the filtrate. Of these chambers the chambers $5_1$ serves as chamber for the formation of sludge or cake. It can be connected either firmly with a sludge pump or to a higher situated supply vessel, that is under pressure or the sludge can be freely supplied to this chamber also without pressure, in which case the constant filling of the chamber can be maintained by an adjustable overflow known per se.

The chamber $5_2$ serves for the washing. Washing medium is supplied to it. If countercurrent washing is desired, the washing chamber $5_2$ will be subdivided into suitable chamber departments by displacing one or more separating stoppers 4 by arrangement of a plurality of separating member apertures and corresponding supply pipes. By this means there is attained the desired concentration of the washing medium and at the same time its consumption is decreased.

In this construction of the filter it is possible to produce, according to the requirements, the necessary pressure difference either simply by subatmospheric pressure (connection of a vacuum pump to the control device 6) or only by excess pressure introduced into the chambers $5_1$ to $5_3$.

Also use can be made of both possibilities together and by this means attain a pressure difference higher by one atmosphere than at working with simply pressure without having to reinforce the strength of the casing of the housing.

The chamber $5_3$ serves for the drying of the filter cake (driving out the liquid) and can be carried out either by compressed air, or air is simply sucked through the filter cake through the control device 6 by means of production of pressure below atmospheric pressure. The two possibilities can also be combined.

The chamber 54 finally serves for the withdrawal of the cake. It can be constructed closed as the other chambers, in which case the withdrawal of the cake can be effected in case of need by known means, such as endless screw, bucket wheels, standard sluices, etc. It is also possible to construct this chamber open up to the lateral annular rib.

As cake removing devices those usual on rotary filters can be used, such as, for example, scrapers, which however must be moved forwards and backwards in the tempo of the passing separating ribs. The removal of the cake can also be affected by compressed air or liquid under pressure. A grid of well known construction, mounted for tipping, can be embedded into the cake during the filtration, in order to tip it out together with the grid from the space between the separating ribs during the removal. It may also be pointed out that it is also possible to displace the position of the zones to the vertical axis line of the drum by turning, if this should prove favourable in special cases. The lateral packing of the drum against the housing is done in the usual manner by stuffing boxes, packing rings, draw belts, counter-pressure chambers or the like.

In many cases it will be thought desirable that this filter need not act against the force of gravity, so that the trough with stirring mechanism can be omitted.

I claim:

A device for separating the liquid and solid components from a suspension by means of a rotary filter, comprising an outer casing having a shell consisting of liquid-nonpermeable material, a plurality of separating members inserted into the shell of the casing and extending parallel to the axis of the drum and in radial direction between the shell and the drum, an inner filtering drum having a plurality of separating walls which extend parallel to the axis and the spacing between the separating walls is less than the width of the separating members, and means for adjusting and pressing down the separating members against the separating walls, the arrangement being such that the intermediate space between the outer casing and the filtering drum is subdivided by the separating members into several chambers which are air-tightly and liquid-tightly separated from one another; said chambers being respectively provided with openings for the supply of the suspension, of the washing medium, of the drying media, as well as for the discharge of the dried residue.

References Cited in the file of this patent

UNITED STATES PATENTS

| | | |
|---|---|---|
| 1,051,161 | Robacher | Jan. 21, 1913 |
| 1,268,273 | Nicholas | June 4, 1918 |
| 1,948,947 | O'Keefe | Feb. 27, 1934 |
| 2,059,166 | Banks et al. | Oct. 27, 1936 |
| 2,449,902 | Kiersted, Jr. | Sept. 21, 1948 |

FOREIGN PATENTS

| | | |
|---|---|---|
| 21,792 | Norway | Nov. 24, 1910 |
| 58,307 | Norway | Feb. 28, 1935 |